US009862407B2

(12) United States Patent
Nozawa et al.

(10) Patent No.: US 9,862,407 B2
(45) Date of Patent: Jan. 9, 2018

(54) ELECTRIC POWER STEERING APPARATUS

(71) Applicants: JTEKT CORPORATION, Osaka-shi, Osaka (JP); NISSAN MOTOR CO., LTD., Yokohama-shi, Kanagawa (JP)

(72) Inventors: Tetsuya Nozawa, Okazaki (JP); Shinya Aono, Okazaki (JP); Takayuki Ohta, Okazaki (JP); Tomohiko Usui, Atsugi (JP); Yuuichi Fukuyama, Yokohama (JP); Takashi Sekiguchi, Tamil Nadu (IN)

(73) Assignees: JTEKT CORPORATION, Osaka-shi (JP); NISSAN MOTOR CO., LTD., Yokohama (JP)

( * ) Notice: Subject to any disclaimer, the term of this patent is extended or adjusted under 35 U.S.C. 154(b) by 138 days.

(21) Appl. No.: 14/224,247

(22) Filed: Mar. 25, 2014

(65) Prior Publication Data
US 2014/0297123 A1 Oct. 2, 2014

(30) Foreign Application Priority Data

Mar. 29, 2013 (JP) .................................. 2013-073715

(51) Int. Cl.
*B62D 5/04* (2006.01)
*B62D 6/04* (2006.01)
(52) U.S. Cl.
CPC ............. *B62D 5/0463* (2013.01); *B62D 6/04* (2013.01)
(58) Field of Classification Search
CPC .................. B62D 5/0463; B62D 6/04
(Continued)

(56) References Cited

U.S. PATENT DOCUMENTS

2007/0029129 A1* 2/2007 Shiozawa ................ B62D 6/04
180/446
2008/0147276 A1* 6/2008 Pattok ...................... B62D 6/04
701/42
(Continued)

FOREIGN PATENT DOCUMENTS

CN 101734282 A 6/2010
CN 102770328 A 11/2012
(Continued)

OTHER PUBLICATIONS

Feb. 26, 2015 Search Report issued in European Application No. 14161663.1.
(Continued)

*Primary Examiner* — Mussa A Shaawat
*Assistant Examiner* — Nadeem Odeh
(74) *Attorney, Agent, or Firm* — Oliff PLC

(57) ABSTRACT

An electric power steering apparatus includes a motor for applying assist torque to a vehicle steering mechanism and a controller, which controls driving of the motor to cause the assist torque to follow an assist command value. The controller calculates a basic assist command value based on steering torque applied to the steering mechanism and corrects the basic assist command value using a correction value, thereby setting the assist command value. If the steering torque has an absolute value greater than a threshold value when the vehicle is in a straight-line traveling state, the controller sets the correction value such that the absolute value of the steering torque is reduced. If the steering torque has an absolute value less than the threshold value when the vehicle is in a straight-line traveling state, the controller sets the correction value such that the absolute value of the assist command value is reduced.

9 Claims, 9 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2009/0287377 A1* | 11/2009 | Nakamura | B62D 6/04 |
| | | | 701/42 |
| 2010/0070135 A1 | 3/2010 | Wang et al. | |
| 2010/0125391 A1 | 5/2010 | Yang | |
| 2011/0022270 A1* | 1/2011 | Tamaizumi | B62D 5/0463 |
| | | | 701/41 |
| 2011/0046841 A1* | 2/2011 | Yamazaki | B62D 6/007 |
| | | | 701/31.4 |
| 2012/0296525 A1 | 11/2012 | Endo et al. | |
| 2014/0222293 A1* | 8/2014 | Raad | B62D 6/00 |
| | | | 701/42 |

FOREIGN PATENT DOCUMENTS

| | | |
|---|---|---|
| EP | 1512608 A2 | 3/2005 |
| EP | 2130743 A1 | 12/2009 |
| JP | 2007-168617 A | 7/2007 |
| JP | 2010-095180 A | 4/2010 |
| JP | A-2010-095180 | 4/2010 |
| JP | 2011-121444 A | 6/2011 |
| JP | 2011-245931 A | 12/2011 |

OTHER PUBLICATIONS

Mar. 14, 2017 Office Action issued in Japanese Application No. 2013-073715.
Apr. 24, 2017 Office Action issued in Chinese Patent Application No. 201410116043.6.

* cited by examiner

ELECTRIC POWER STEERING APPARATUS

CROSS-REFERENCE TO RELATED APPLICATIONS

This application is based on and claims priority from Japanese Patent Application No. 2013-073715, filed on Mar. 29, 2013, the entire contents of which are incorporated herein by reference.

BACKGROUND OF THE INVENTION

The present invention relates to an electric power steering apparatus that assists a vehicle steering operation.

When a vehicle is traveling, a steering operation is needed in some cases even if the vehicle is in the straight-line traveling state. For example, if the vehicle is deflected by travelling on a canted road or due to the influence of a crosswind or insufficient wheel alignment, a steering operation is needed to suppress the deflection. If such deflection of the vehicle continues for an extended period, the driver needs to keep applying steering torque to the steering mechanism of the vehicle even if the vehicle is in the straight-line traveling state. The resultant continuous physical burden accumulates as fatigue of the driver, which is not favorable. In this regard, Japanese Laid-Open Patent Publication No. 2010-254178 discloses an electric power steering apparatus that executes what is referred to as lead pull compensation control, in which when steering torque is applied to the steering mechanism of the vehicle even if the vehicle is in the straight-line traveling state, an assist command value is modified to decrease the absolute value of the steering torque.

SUMMARY OF THE INVENTION

In the conventional lead pull compensation control, the assist command value continues being modified if the vehicle continues being in the straight-line traveling state even after the absolute value of the steering torque is decreased. Therefore, for example, even in a case where the gradient of a canted road decreases during the lead pull compensation control and the driver finely steers the steering wheel in a range including the neutral position, assist torque is generated through the lead pull compensation control. However, in a fine steering operation range, in which the steering torque has a value close to zero, the assist command value is originally set to zero or a value close to zero. Thus, if generated, assist torque would give a sense of discomfort to the driver.

Accordingly, it is an objective of the present invention to provide an electric power steering apparatus that is capable of eliminating a sense of discomfort experienced by the driver during a fine steering operation of the steering wheel.

To achieve the foregoing objective and in accordance with one aspect of the present invention, an electric power steering apparatus including a motor and a controller is provided. The motor applies assist torque to a steering mechanism of a vehicle. The controller controls driving of the motor to cause the assist torque to follow an assist command value. The controller calculates a basic assist command value based on steering torque applied to the steering mechanism and corrects the basic assist command value using a correction value, thereby setting the assist command value. If the steering torque has an absolute value greater than a threshold value when the vehicle is in a straight-line traveling state, the controller sets the correction value such that the absolute value of the steering torque is reduced. If the steering torque has an absolute value less than the threshold value when the vehicle is in a straight-line traveling state, the controller sets the correction value such that the absolute value of the assist command value is reduced.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

<First Embodiment>

An electric power steering apparatus according to a first embodiment of the present invention will now be described.

Figure 1:
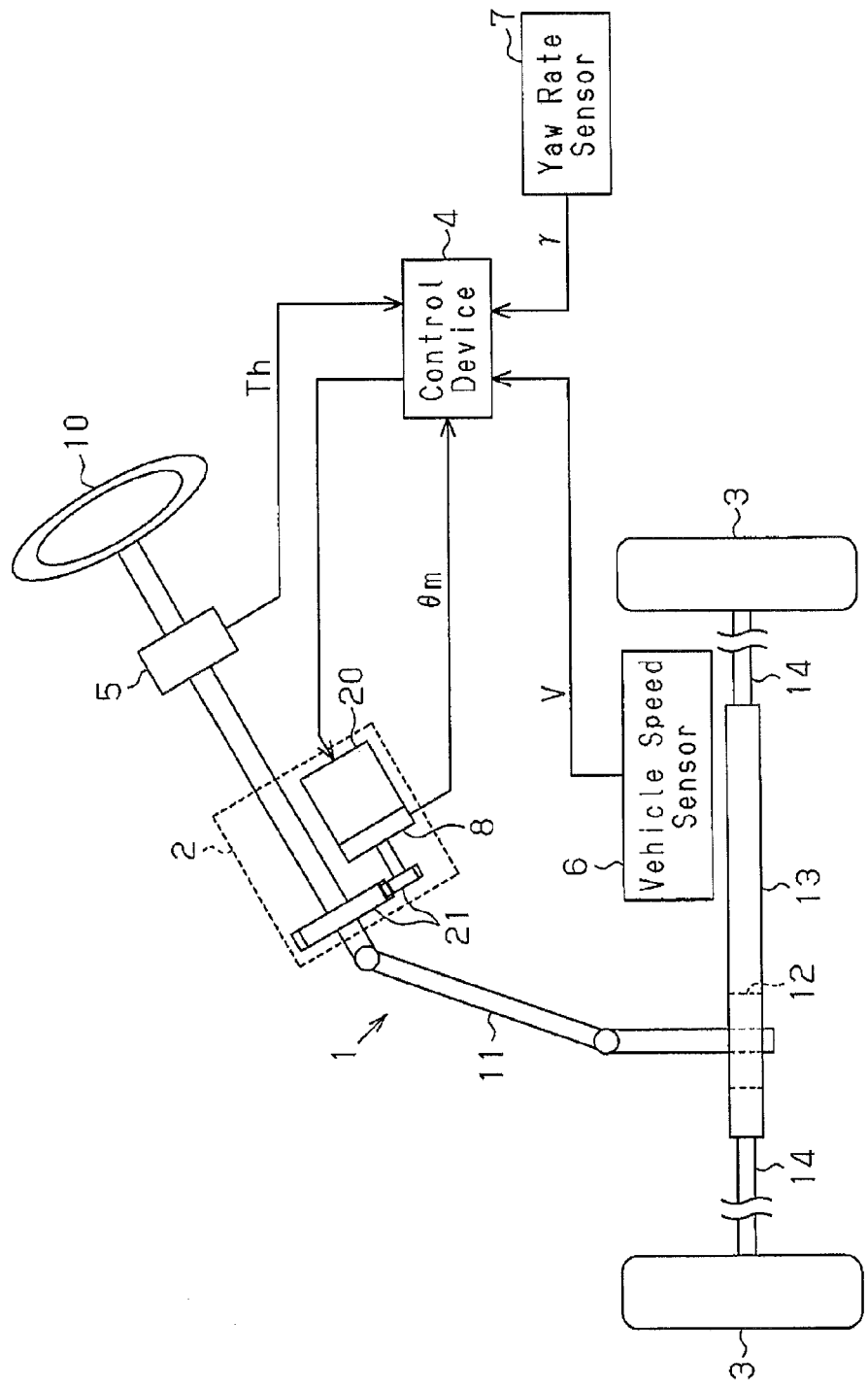
FIG. 1 is a block diagram schematically showing an electric power steering apparatus according to a first embodiment of the present invention.

As shown in FIG. 1, the electric power steering apparatus includes a steering mechanism 1 that turns steerable wheels 3 based on manipulation on a steering wheel 10 by a driver, and an assist mechanism 2 that assists steering operation by the driver.

The steering mechanism 1 includes a steering shaft 11, which serves as the rotary shaft of the steering wheel 10, and rack shaft 13, which is coupled to the lower end of the steering shaft 11 through a rack and pinion mechanism 12. In the steering mechanism 1, when the steering shaft 11 rotates in response to a driver's steering operation, the rotary motion of the steering shaft 11 is converted to axial reciprocating linear motion of the rack shaft 13 through the rack and pinion mechanism 12. The reciprocating linear motion of the rack shaft 13 is transmitted to the steerable wheels 3 through tie rods 14 coupled to opposite ends of the rack shaft 13. This changes the steered angle of each steerable wheel 3, thereby changing the traveling direction of the vehicle.

The assist mechanism 2 includes a motor 20 that applies assist torque to the steering shaft 11. The motor 20 is a three-phase brushless motor. Rotation of the motor 20 is transmitted to the steering shaft 11 through a speed reduction device 21, so that the motor torque is applied to the steering shaft 11. The steering operation is thus assisted.

The electric power steering apparatus includes various types of sensors that detect the amount of manipulation on the steering wheel 10 and state quantities of the vehicle. As an example, the steering shaft 11 is provided with a torque sensor 5, which detects torque (steering torque) Th applied to the steering shaft 11 in response to a driver's steering operation. In the present embodiment, the sign of the steering torque Th is defined as a positive value when the steering wheel 10 is steered rightward, and is defined as a negative value when the steering wheel is steered leftward. The vehicle has a vehicle speed sensor 6 for detecting a traveling speed V of the vehicle and a yaw rate sensor 7 for detecting a yaw rate $\gamma$, which is the rate of change of the rotation angle in the turning direction of the vehicle body. The motor 20 is provided with a rotation angle sensor 8 that detects a rotation angle $\theta m$ of the motor 20. A control device (controller) 4 receives outputs from these sensors 5 to 8. The control device 4 controls driving of the motor 20 based on the output from each of these sensors 5 to 8.

Figure 2:
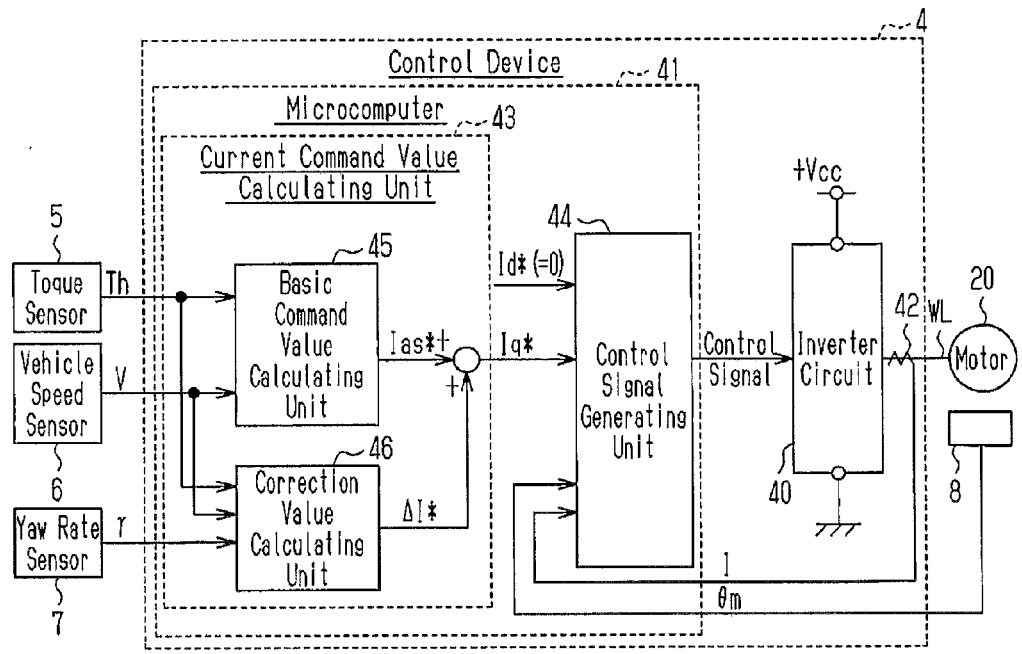
FIG. 2 is a block diagram showing a control device of the electric power steering apparatus according to the first embodiment.

As shown in FIG. 2, the control device 4 includes an inverter circuit 40 and a microcomputer 41. The inverter circuit 40 converts DC voltage supplied from a power supply such as an on-board battery (power supply voltage +Vcc) to AC voltage of three phases (U phase, V phase, and W phase). The microcomputer 41 drives the inverter circuit 40 by pulse width modulation (PWM).

The inverter circuit 40 converts DC voltage supplied from the power supply to three-phase AC voltage based on a control signal (PWM driving signal) given from the microcomputer 41. The three-phase AC voltage is supplied to the motor 20 through a feed line WL. The feed line WL is provided with a current sensor 42 that detects a current value I of each phase of the motor 20. The microcomputer 41 receives an output from the current sensor 42. For the illustrative purposes, one feed line WL represents lines for the three phases and one current sensor 42 represents three sensors for the respective phases in FIG. 2.

The microcomputer 41 further receives outputs from the torque sensor 5, the vehicle speed sensor 6, the yaw rate sensor 7, and the rotation angle sensor 8. The microcomputer 41 generates, at a predetermined control cycle, control signals based on the steering torque Th, the vehicle speed V, the yaw rate $\gamma$, the motor rotation angle $\theta m$, and the current value I of each phase detected by these sensors. The microcomputer 41 outputs the control signal to the inverter circuit 40 to drive the inverter circuit 40 by PWM, thereby controlling driving of the motor 20.

The following describes in detail the control of driving of the motor 20 by the microcomputer 41.

As shown in FIG. 2, the microcomputer 41 includes a current command value calculating unit 43 and a control signal generating unit 44. The current command value calculating unit 43 calculates a current command value Iq*, which corresponds to a target value of the assist torque applied to the steering shaft 11 (or assist command value). The control signal generating unit 44 generates a control signal based on a current command value Id* and the current command value Iq*. The current command value Iq* is a current command value on the q-axis of a d/q coordinate system. The current command value Id* is a current command value on the d-axis of the d/q coordinate system and is fixed at zero. The current command values Id*, Iq* are used as target values of currents to be supplied to the motor 20.

The current command value calculating unit 43 includes a basic command value calculating unit 45 and a correction value calculating unit 46. The basic command value calculating unit 45 calculates a basic current command value Ias*, which is the primary component of the q-axis current command value Iq*. The correction value calculating unit 46 calculates a correction value $\Delta I^*$ of the q-axis current command value Iq*.

Figure 3:
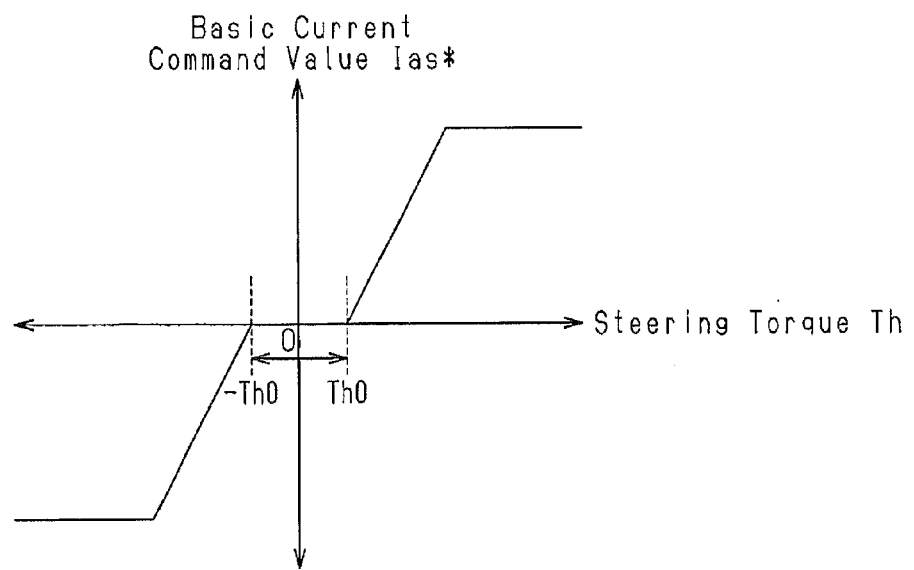
FIG. 3 is a graph showing a map used in the first embodiment to calculate a basic current command value from steering torque.

The basic command value calculating unit 45 calculates the basic current command value Ias* based on the steering torque Th and the vehicle speed V. Specifically, the greater the absolute value of the steering torque Th and the slower the vehicle speed V, the greater the absolute value of the basic current command value Ias* is set to. As shown in FIG. 3, a dead zone, in which the basic current command value Ias* is set to zero regardless of the value of the steering torque Th, is provided in a range where the absolute value of the steering torque Th is less than or equal to a predetermined value Th0 (Th0>0). In the present embodiment, the basic current command value Ias* corresponds to a basic assist command value, which is the primary component of the assist command value.

As shown in FIG. 2, the correction value calculating unit 46 calculates the correction value $\Delta I^*$ through the lead pull compensation control. That is, the correction value calculating unit 46 determines whether the vehicle is in the straight-line traveling state based on the vehicle speed V and the yaw rate $\gamma$. When the vehicle is determined to be in the straight-line traveling state, the correction value calculating unit 46 calculates the correction value $\Delta I^*$ such that the absolute value of the detected steering torque Th is reduced. The current command value calculating unit 43 then adds the correction value $\Delta I^*$ to the basic current command value Ias* calculated by the basic command value calculating unit 45 to generate the q-axis current command value Iq*, and outputs the generated q-axis current command value Iq* to the control signal generating unit 44.

The control signal generating unit 44 executes current feedback control of the d/q coordinate system based on the current command values Id*, Iq*, the phase current values I, and the motor rotation angle e, thereby generating a control signal. Specifically, the control signal generating unit 44 maps the phase current values I onto the d/q coordinates based on the motor rotation angle $\theta m$, thereby calculating a d-axis current value Id and a q-axis current value Iq, which are the actual current values of the motor 20 in the d/q coordinate system. The control signal generating unit 44 generates a control signal by subjecting the d-axis current value Id and the q-axis current value Iq to current feedback control, thereby causing such that the d-axis current value Id and the q-axis current value Iq follow the d-axis current command value Id* and the q-axis current command value Iq*, respectively. The generated control signal is output to the inverter circuit 40, so that the motor 20 receives a drive current that corresponds to the control signal. Accordingly, the driving of the motor 20 is controlled such that the assist torque of the motor 20 follows the assist command value, which corresponds to the q-axis current command value Iq*. In the present embodiment, if the q-axis current command value Iq* is set as a positive value, assist torque in the rightward steering direction is applied to the steering shaft 11. If the q-axis current value Iq* is set as a negative value, assist torque in the leftward steering direction is applied to the steering shaft 11. The greater the absolute value of the q-axis current command value Iq*, the greater the absolute value of the assist torque applied to the steering shaft 11 becomes.

Figure 4:
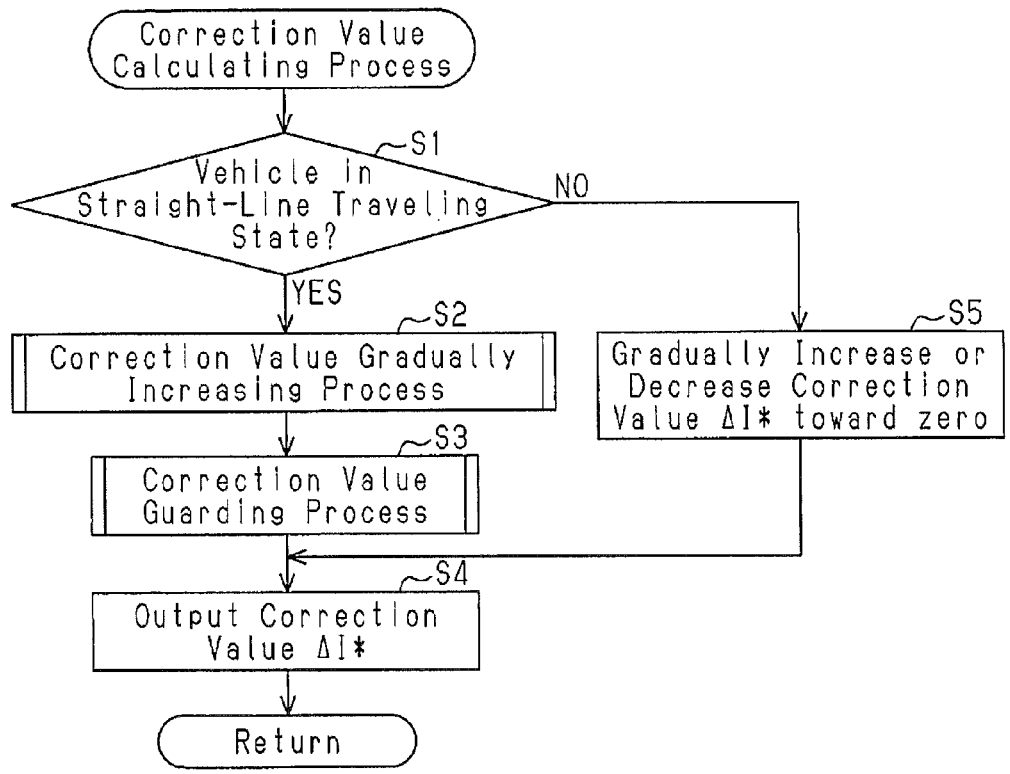
FIG. 4 is a flowchart showing a procedure of a correction value calculation process performed by a correction value calculating unit of the first embodiment.

With reference to FIG. 4, a procedure in which the correction value calculating unit 46 calculates the correction value $\Delta I^*$ will be described. The initial value of the correction value $\Delta I^*$ is set to zero. The correction value calculating unit 46 executes the process shown in FIG. 4 at a predetermined control cycle.

Figure 5:
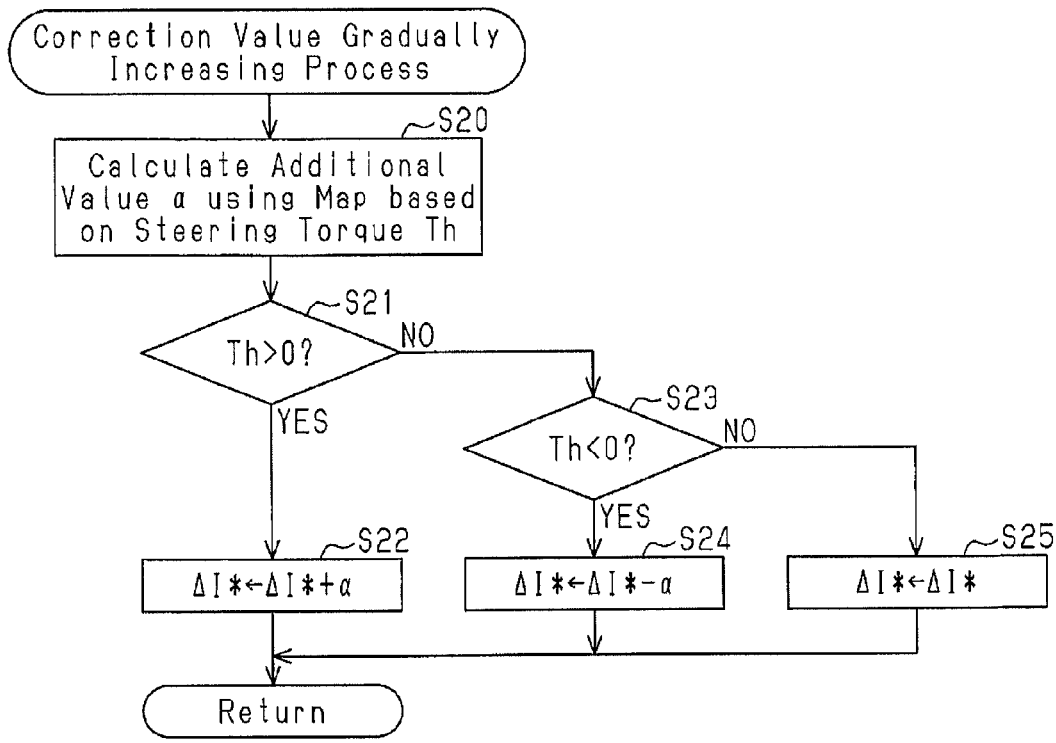
FIG. 5 is a flowchart showing a procedure of a correction value gradually increasing process performed by the correction value calculating unit of the first embodiment.

As shown in FIG. 4, the correction value calculating unit 46 first determines whether the vehicle is in the straight-line traveling state based on the vehicle speed V and the yaw rate γ (step S1). Specifically, the vehicle is determined to be in the straight-line traveling state when the vehicle speed V is greater than a predetermined value and the absolute value of the yaw rate γ is less than or equal to a predetermined value. If the vehicle is in the straight-line traveling state (step S1: YES), the correction value calculating unit 46 executes a correction value gradually increasing process (step S2). FIG. 5 shows the procedure of the correction value gradually increasing process.

Figure 6:
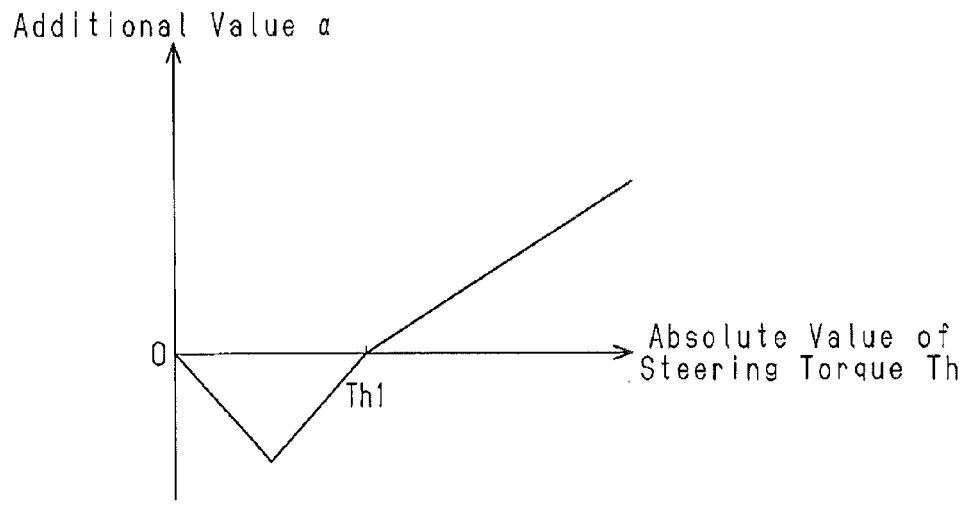
FIG. 6 is a graph showing a map used in the first embodiment to calculate an additional value from steering torque.

As shown FIG. 5, in the correction value gradually increasing process, the correction value calculating unit 46 first calculates an additional value α using a map and based on the steering torque Th (step S20). Specifically, the correction value calculating unit 46 has a map shown in FIG. 6, which shows the relationship between the absolute value of the steering torque Th and the additional value α. As shown in FIG. 6, when the absolute value of the steering torque Th is less than a first threshold value Th1, the additional value α is set to a negative value. When the absolute value of the steering torque Th is equal to the first threshold value Th1, the additional value α is set to zero. Further, when the absolute value of the steering torque Th is greater than the first threshold value Th1, the additional value α is set to a positive value such that the greater the steering torque Th, the greater the additional value α becomes. The first threshold value Th1 is set to a value that allows the determination on whether the steering wheel 10 is being finely steered (for example, 1 Nm). The correction value calculating unit 46 uses the map shown in FIG. 6 to calculate the additional value α from the steering torque Th. Subsequently, as shown in FIG. 5, the correction value calculating unit 46 determines whether the steering torque Th is greater than zero (step S21). If the steering torque Th is greater than zero (step S21: YES), the correction value calculating unit 46 adds the additional value α to the correction value $\Delta I^*$ of the previous cycle to calculate a new correction value $\Delta I^*$ (step S22). If the steering torque Th is not greater than zero (step S21: NO), the correction value calculating unit 46 determines whether the steering torque Th is less than zero (step S23). If the steering torque Th is less than zero (step S23: YES), the correction value calculating unit 46 subtract the additional value α from the correction value $\Delta I^*$ of the previous cycle to calculate a new correction value $\Delta I^*$ (step S24). In contrast, when the steering torque Th is not less than zero (step S23: NO), that is, when the steering torque Th is zero, the correction value calculating unit 46 uses the correction value $\Delta I^*$ of the previous cycle as a new correction value $\Delta I^*$ without changing it (step S25).

Figure 7:
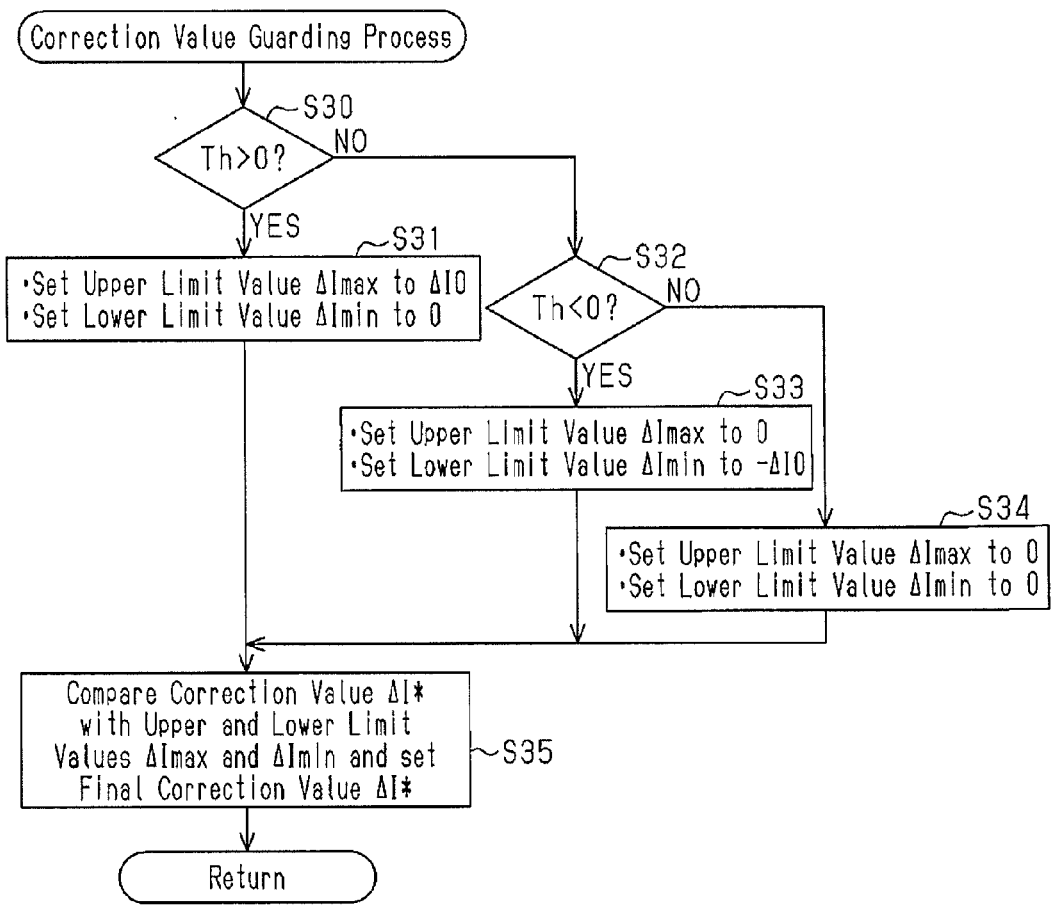
FIG. 7 is a flowchart showing a procedure of a correction value guarding process performed by the correction value calculating unit of the first embodiment.

After executing the correction value gradually increasing process of step S2, the correction value calculating unit 46 executes a correction value guarding process (step S3) as shown in FIG. 4. FIG. 7 shows the procedure of the correction value guarding process.

As shown in FIG. 7, in the correction value guarding process, the correction value calculating unit 46 first determines whether the steering torque Th is greater than zero (step S30). If the steering torque Th is greater than zero (step S30: YES), an upper limit value $\Delta I_{max}$ is set to a predetermined value $\Delta I_0$ ($\Delta I_0 > 0$), and a lower limit value $\Delta I_{min}$ is set to zero (step S31). If the steering torque Th is not greater than zero (step S30: NO), the correction value calculating unit 46 determines whether the steering torque Th is less than zero (step S32). If the steering torque Th is less than zero (step S32: YES), the upper limit value $\Delta I_{max}$ is set to zero, and the lower limit value $\Delta I_{min}$ is set to a predetermined value $-\Delta I_0$ (step S33). In contrast, when the steering torque Th is not less than zero (step S32: NO), that is, when the steering torque Th is zero, the correction value calculating unit 46 sets both the upper and lower limit values $\Delta I_{max}$, $\Delta I_{min}$ to zero (step S34).

After executing any of steps S31, S33, and S34, the correction value calculating unit 46 compares the correction value $\Delta I^*$ with the upper and lower limit values $\Delta I_{max}$, $\Delta I_{min}$ to set the final value of the correction value $\Delta I^*$ (step S35). Specifically, when the correction value $\Delta I^*$ is greater than the upper limit value $\Delta I_{max}$, the correction value calculating unit 46 sets the upper limit value $\Delta I_{max}$ as the correction value $\Delta I^*$. When the correction value $\Delta I^*$ is less than the lower limit value $\Delta I_{min}$, the correction value calculating unit 46 sets the lower limit value $\Delta I_{min}$ as the correction value $\Delta I^*$. Except for these cases, the correction value $\Delta I^*$ is used without being changed. Through the process, the correction value $\Delta I^*$ is limited in the range $\Delta I_{min} \leq \Delta I^* \leq \Delta I_{max}$.

Figure 8:
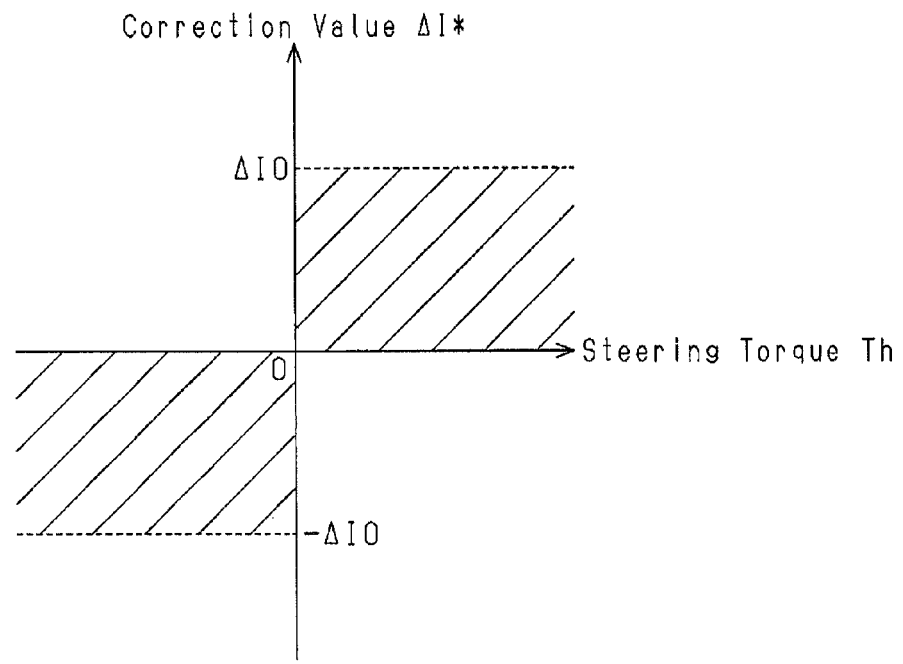
FIG. 8 is a graph related to the first embodiment and shows by hatched lines the range of possible values of a correction value in relation to steering torque.

When the correction value calculating unit 46 executes the correction value guarding process, the correction value $\Delta I^*$ is limited within the range represented by the hatched lines in FIG. 8. That is, when the absolute value of the steering torque Th is greater than zero, the correction value $\Delta I^*$ is set to zero if the signs of the correction value $\Delta I^*$ and the steering torque Th are different from each other, in other words, if the direction of the assist torque corresponding to the correction value $\Delta I^*$ is different from the direction of the steering torque Th. When the steering torque Th is zero, the correction value $\Delta I^*$ is set to zero.

After executing the correction value guarding process of step S3, the correction value calculating unit 46 outputs the finally determined correction value $\Delta I^*$ (step S4) as shown in FIG. 4. In contrast, when the vehicle is not in the straight-line traveling state (step S1: NO), the correction value calculating unit 46 outputs the correction value $\Delta I^*$ (step S4) after gradually increasing or decreasing the correction value $\Delta I^*$ toward zero (step S5).

Operation of the electric power steering apparatus of the present embodiment will now be described. In the following, a case will be discussed in which the direction of the steering torque Th is the rightward direction, that is, the sign of the steering torque Th is positive.

Due to deflection of the vehicle, the driver may apply steering torque Th that is greater than the first threshold value Th1 to the steering wheel 10 even if the vehicle is in the straight-line traveling state. In such a case, the correction value calculating unit 46 sets the additional value a to a positive value based on the map shown in FIG. 6, and increases the correction value ΔI* by the additional value α. Accordingly, the q-axis current command value Iq* is increased to increase the assist torque. This reduces the steering torque Th of the driver. Thereafter, the correction value calculating unit 46 gradually increases the correction value ΔI* based on the additional value α, which is set in each control cycle. This gradually increases the q-axis current command value Iq*, so that the assist torque is gradually increased. As a result, the steering torque Th of the driver is gradually decreased. This reduces the physical burden of steering due to the deflection of the vehicle experienced by the driver.

If the correction value ΔI* is simply gradually increased as in the conventional lead pull compensation control, the driver may experience a sense of discomfort, for example, when the gradient of a canted road decreases and the driver finely steers the steering wheel 10 in a range including the neutral position. That is, since the fine steering region, in which the steering torque Th is zero or close to zero, is originally a dead zone, the q-axis current command value Iq* is preferably zero. In this respect, when the steering torque Th has a value close to zero, the basic current command value Ias* is set to zero. However, in the conventional lead pull compensation control, even if the steering torque Th is decreased to a value close to zero, the correction value ΔI* is added to the basic current command value Ias* without being reduced if the straight-line traveling state continues. Therefore, even in the dead zone, the q-axis current command value Iq* is not set to zero, and the assist torque that corresponds to the correction value ΔI* acts on the steering shaft 11. This gives a sense of discomfort to the driver.

In this respect, according to the present embodiment, if the driver is finely steering the steering wheel 10 by a steering torque Th satisfying the expression 0<Th<Th1, the additional value α is set to a negative value. Therefore, in the fine steering region, the correction value calculating unit 46 gradually decreases the correction value ΔI* based on the additional value α, which is set in each control cycle. Accordingly, the q-axis current command value Iq* is gradually decreased to gradually decrease the assist torque, which eliminates the sense of discomfort experienced by the driver.

In contrast, when the correction value calculating unit 46 gradually decreases the correction value ΔI*, the driver may experience a sense of discomfort if the correction value ΔI* changes from a positive value to a negative value. That is, when the correction value ΔI* becomes a negative value, the q-axis current command value Iq* also becomes negative value. The assist torque becomes a negative value, accordingly. In this case, the assist torque is in the opposite direction from the steering torque Th satisfying the expression 0<Th<Th1. This is not favorable.

In this respect, according to the present embodiment, when the steering torque Th satisfies the expression 0<Th, the lower limit value of the correction value ΔI* is set to zero. The correction value ΔI* is thus not set to a negative value. Therefore, no counter assist torque acts on the steering mechanism 1 during fine steering. This improves the steering sensation experienced by the driver.

Thus far, a case in which the steering torque Th is greater than zero has been described. However, it is obvious that the same effects will be achieved even if the steering torque Th is less than zero.

The electric power steering apparatus according to the present embodiment, which is described above, achieve the following advantages.

(1) The control device 4 calculates the basic current command value Ias* based on the steering torque Th, and corrects the basic current command value Ias* using the correction value ΔI*, thereby calculating the q-axis current command value Iq*. When the vehicle is in the straight-line traveling state and the absolute value of the steering torque Th is greater than the first threshold value Th1, the correction value ΔI* is set such that the absolute value of the steering torque Th is decreased. This lead pull compensation control reduces the physical burden of steering due to deflection of the vehicle experienced by the driver.

(2) When the vehicle is in the straight-line traveling state and the absolute value of the steering torque Th is less than the first threshold value Th1, the control device 4 sets the correction value ΔI* such that the absolute value of the q-axis current command value Iq* is decreased. This reduces unnecessary assist torque applied to the steering mechanism 1 through the lead pull compensation control during fine steering, so that the sense of discomfort experienced by the driver is eliminated. Particularly, in the case of the control device 4 of the present embodiment, which has a dead zone in which when the steering torque Th has a value close to zero, the basic current command value Ias* is set to zero, unnecessary assist torque is not applied to the steering mechanism 1 in the dead zone. Thus, the steering sensation experienced by the driver in the dead zone is reliably ensured.

(3) When the absolute value of the steering torque Th is greater than zero, the control device 4 sets the correction value ΔI* to zero if the signs of the correction value ΔI* and the steering torque Th are different from each other. When the steering torque Th is zero, the correction value ΔI* is also set to zero. Therefore, no counter assist torque acts on the steering mechanism 1 during fine steering. This improves the steering sensation experienced by the driver.

<Second Embodiment>

An electric power steering apparatus according to a second embodiment of the present invention will now be described. Differences from the first embodiment will mainly be described.

Figure 9A:
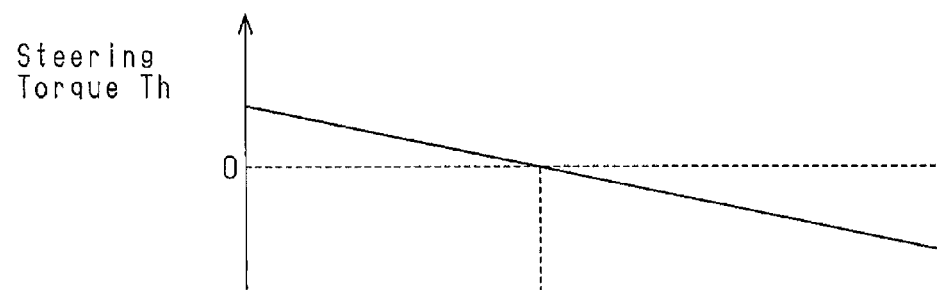
FIGS. 9(a) and 9(b) are timing charts related to the first embodiment and show changes over time of the steering torque and the correction value.
Figure 9B:
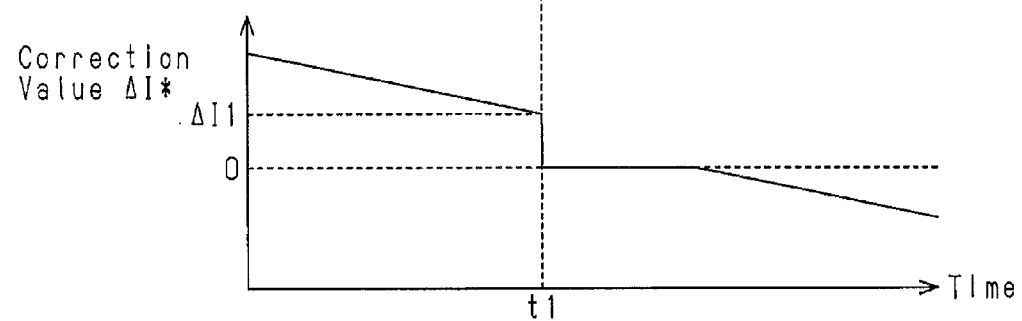

In the first embodiment, the correction value ΔI* is limited as shown in FIG. 8. In this case, the correction value ΔI* may abruptly change when the steering torque Th changes across zero. Specifically, it is assumed that when the steering torque Th changes from a positive value to a negative value as shown in FIG. 9(a), the correction value ΔI* is set to a predetermined value ΔI1 immediately before the steering torque Th reaches zero as shown in FIG. 9(b). Since the correction value calculating unit 46 is configured to set the correction value ΔI* to zero when the steering torque Th is zero as shown in FIG. 8, the correction value calculating unit 46 sets the correction value ΔI* to zero at a point in time t1 when the steering torque Th reaches zero. Therefore, when the steering torque Th changes across zero, the q-axis current command value Iq* changes abruptly. That is, the assist torque changes abruptly while the steering torque Th is substantially not applied. Such an abrupt change may give a strong sense of discomfort to the driver.

Figure 10:
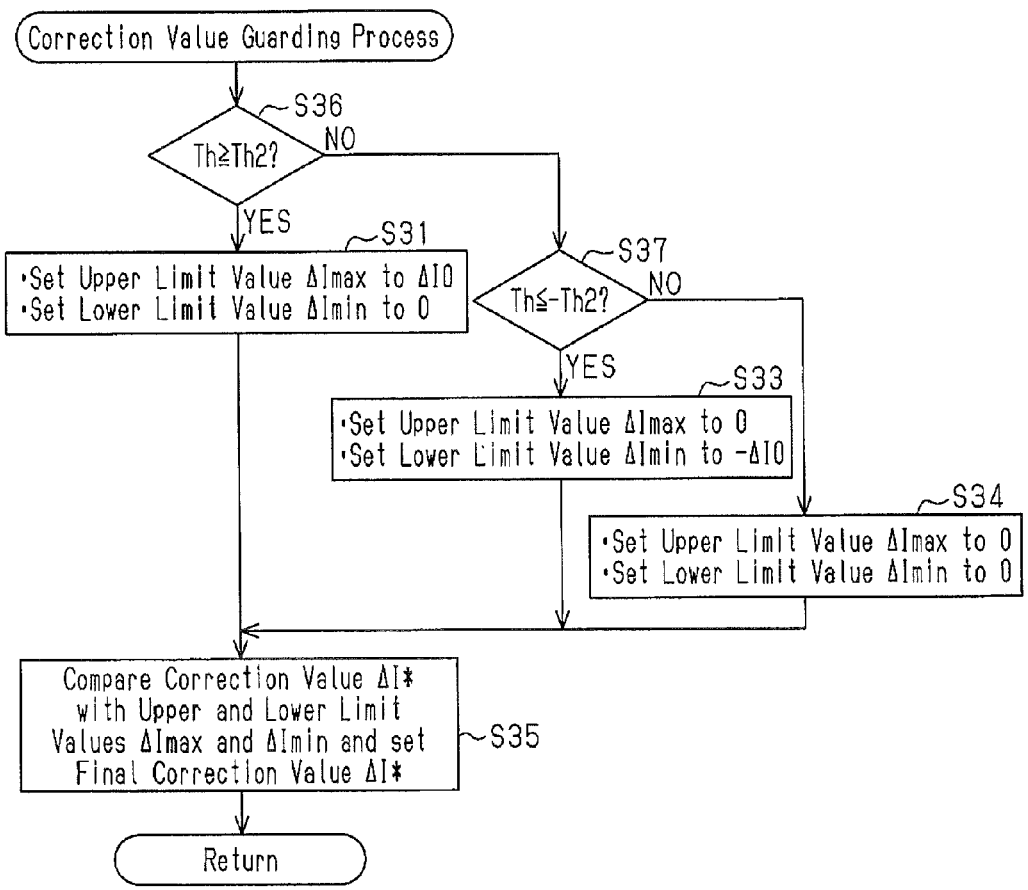
FIG. 10 is a flowchart showing a procedure of a correction value guarding process performed by a correction value calculating unit of an electric power steering apparatus according to a second embodiment of the present invention.

To address the drawback, the correction value calculating unit 46 according to the second embodiment executes a correction value guarding process shown in FIG. 10 instead of the correction value guarding process shown in FIG. 7. That is, the correction value calculating unit 46 first determines whether the steering torque Th is greater than or equal to a second threshold value Th2 (Th2>0) at step S36. The second threshold value Th2 may be equal to or different from the first threshold value Th1. If the steering torque Th is greater than or equal to the second threshold value Th2 (step S36: YES), the upper limit value ΔImax is set to the predetermined value ΔI0, and the lower limit value ΔImin is set to zero (step S31). In contrast, when the steering torque Th is not greater than or equal to the second threshold value Th2 (step S36: NO), the correction value calculating unit 46 determines whether the steering torque Th is less than or equal to a threshold value −Th2, which is the second threshold value Th2 with a negative sign (step S37). If the steering torque Th is less than the threshold value −Th2 (step S37: YES), the upper limit value ΔImax is set to zero, and the lower limit value ΔImin is set to the predetermined value −ΔI0 (step S33). In contrast, when the steering torque Th is not less than or equal to the threshold value −Th2 (step S37: NO), that is, when the steering torque Th satisfies the expression −Th2<Th<Th2, the correction value calculating unit 46 sets both the upper and lower limit values ΔImax, ΔImin to zero (step S34).

Figure 11:
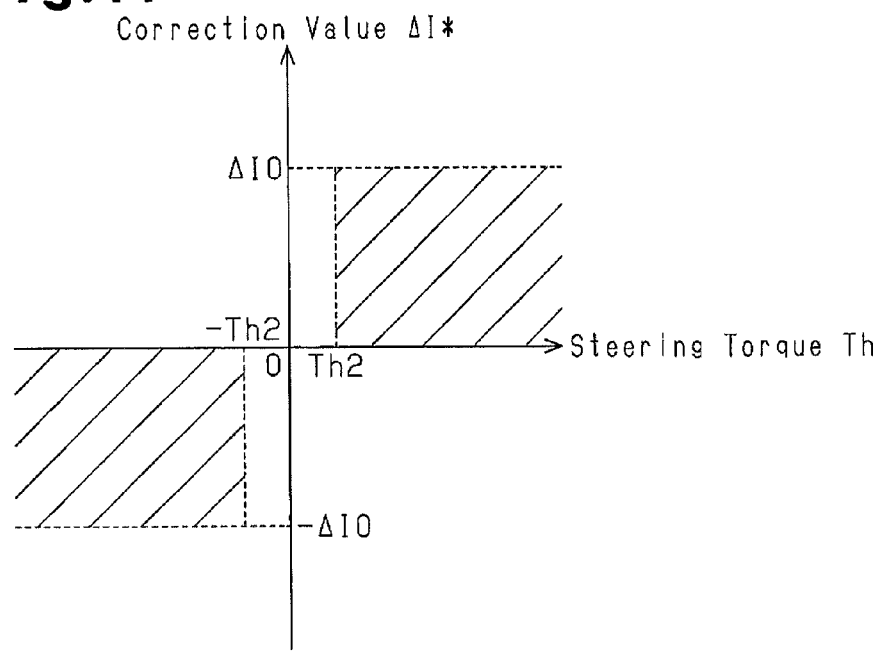
FIG. 11 is a graph related to the second embodiment and shows by hatched lines the range of possible values of a correction value in relation to steering torque.

When the correction value calculating unit 46 executes the correction value guarding process, the correction value ΔI* is limited within the range represented by the hatched lines in FIG. 11. That is, when the absolute value of the steering torque Th is greater than or equal to the second threshold value Th2, the correction value ΔI* is set to zero if the signs of the correction value ΔI* and the steering torque Th are different from each other, in other words, if the direction of the assist torque corresponding to the correction value ΔI* is different from the direction of the steering torque Th. When the absolute value of the steering torque Th is less than the second threshold value Th2, the correction value ΔI* is set to zero.

Operation of the electric power steering apparatus of the second embodiment will now be described.

Figure 12A:
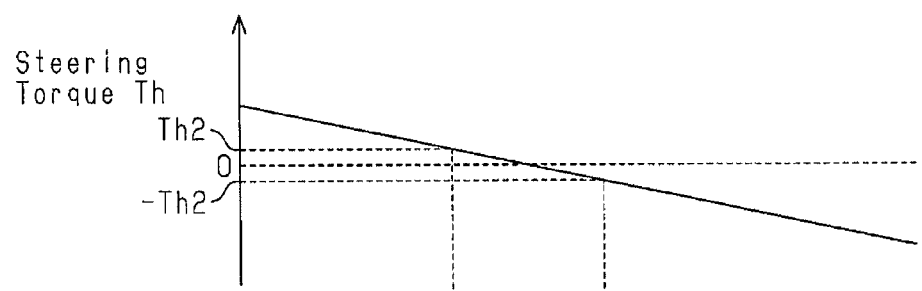
FIGS. 12(a) and 12(b) are timing charts related to the second embodiment and show changes over time of the steering torque and the correction value.
Figure 12B:
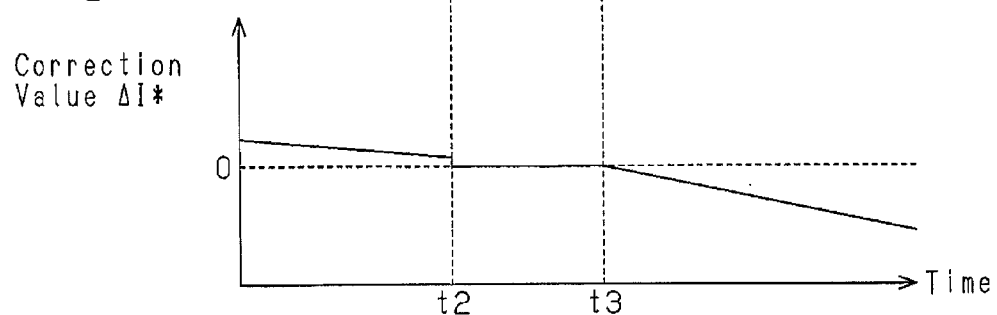

When the steering torque Th changes from a positive value to a negative value as shown in FIG. 12(*a*), the correction value calculating unit 46 sets the correction value ΔI* to zero at a point in time t2, at which the steering torque Th reaches the second threshold value Th2 as shown in FIG. 12(*b*). The steering torque Th having the same sign as the correction value ΔI* is applied to the steering wheel 10 immediately before the point in time t2. That is, since the correction value ΔI* is changed to zero at the point in time t2, at which the steering torque Th having the same sign as the correction value ΔI* is applied to the steering wheel 10, the driver is less likely to experience an abrupt change of the assist torque than in the case of the electric power steering apparatus according to the first embodiment. This reduces the influence of such an abrupt change in the assist torque on the steering sensation.

As described above, the electric power steering apparatus according to the second embodiment achieves, in addition to the advantages (1) and (2) of the first embodiment, the following advantage in place of the advantage (3) of the first embodiment.

(4) When the absolute value of the steering torque Th is greater than or equal to the second threshold value Th2, the control device 4 sets the correction value ΔI* to zero if the signs of the correction value ΔI* and the steering torque Th are different from each other. When the absolute value of the steering torque Th is less than the second threshold value Th2, the correction value ΔI* is set to zero. Therefore, when the steering torque Th changes across zero, the influence of an abrupt change in the assist torque on the steering sensation is reduced. This eliminates a sense of discomfort experienced by the driver.

<Third Embodiment>

An electric power steering apparatus according to a third embodiment of the present invention will now be described. Similar to the electric power steering apparatus of the second embodiment, the electric power steering apparatus of the third embodiment reduces the influence of an abrupt change on the steering sensation when the steering torque Th changes across zero as shown in FIGS. 9(*a*) and 9(*b*), thereby eliminating a sense of discomfort experienced by the driver. Differences from the second embodiment will mainly be described.

Figure 13:
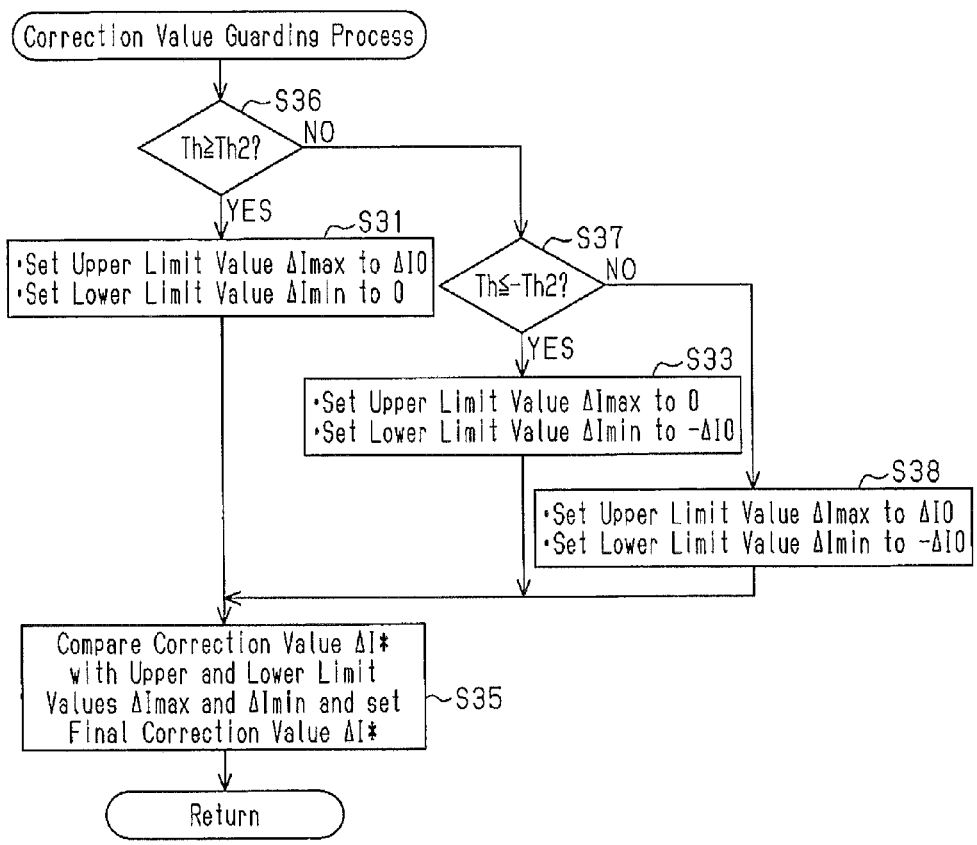
FIG. 13 is a flowchart showing a procedure of a correction value guarding process performed by a correction value calculating unit of an electric power steering apparatus according to a third embodiment of the present invention.

In the third embodiment, the correction value calculating unit 46 executes a correction value guarding process shown in FIG. 13 instead of the correction value guarding process shown in FIG. 10. That is, when the steering torque Th is not less than or equal to the threshold value −Th2 (step S37: NO), that is, when the steering torque Th satisfies the expression −Th2<Th<Th2, the correction value calculating unit 46 sets the upper limit value ΔImax to the predetermined value ΔI0 and sets the lower limit value ΔImin to the predetermined value −ΔI0 (step S38).

Figure 14:
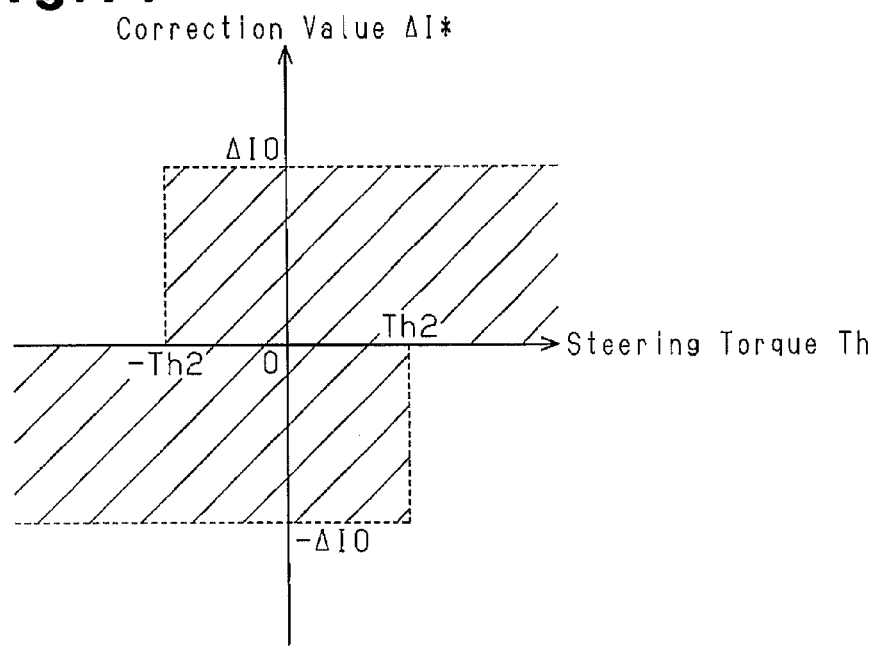
FIG. 14 is a graph related to the third embodiment and shows by hatched lines the range of possible values of a correction value in relation to steering torque.

When the correction value calculating unit 46 executes the correction value guarding process, the correction value ΔI* is limited within the range represented by the hatched lines in FIG. 14. That is, when the absolute value of the steering torque Th is greater than or equal to the second threshold value Th2, the correction value ΔI* is set to zero if the signs of the correction value ΔI* and the steering torque Th are different from each other, in other words, if the direction of the assist torque corresponding to the correction value ΔI* is different from the direction of the steering torque Th. When the absolute value of the steering torque Th is less than the second threshold value Th2, the correction value ΔI* is limited within the range −ΔI0<ΔI*<ΔI0.

Operation of the electric power steering apparatus of the third embodiment will now be described.

Figure 15A:
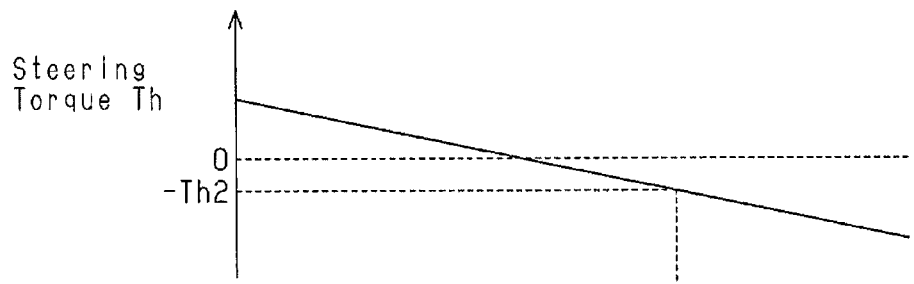
FIGS. 15(a) and 15(b) are timing charts related to the third embodiment and show changes over time of the steering torque and the correction value.
Figure 15B:
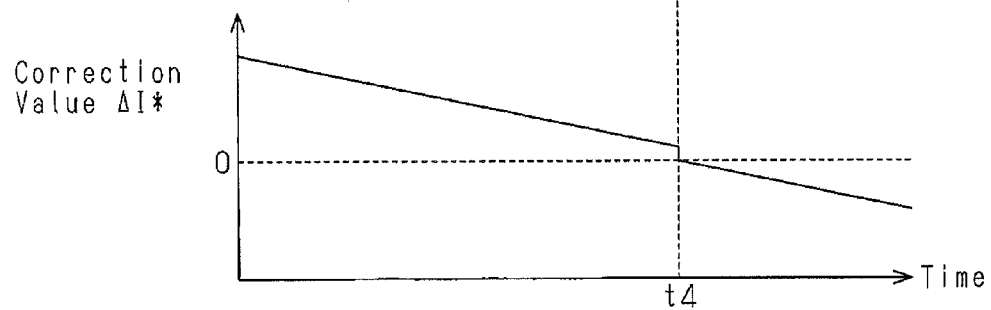

When the steering torque Th changes from a positive value to a negative value as shown in FIG. 15(*a*), the correction value calculating unit 46 sets the correction value ΔI* to zero at a point in time t4, at which the steering torque Th reaches the threshold value −Th2 after changing across zero as shown in FIG. 15(*b*). In this manner, the time at which the correction value ΔI* is caused to be zero is delayed relative to the time at which the steering torque Th changes across zero, so that the amount of change of the correction value ΔI* is reduced compared to the electric power steering apparatus of the above described embodiments. As a result, an abrupt change of the assist torque that occurs when the steering torque Th changes across zero is reduced to a small extent. This eliminates a sense of discomfort experienced by the driver.

As described above, the electric power steering apparatus according to the third embodiment achieves the following advantage in place of the advantage (4) of the second embodiment.

(5) When the absolute value of the steering torque Th is greater than or equal to the second threshold value Th2, the control device 4 sets the correction value ΔI* to zero if the signs of the correction value ΔI* and the steering torque Th are different from each other. When the absolute value of the steering torque Th is less than the second threshold value Th2, the correction value ΔI* is limited within the range −ΔI0<ΔI*<ΔI0. As a result, an abrupt change of the assist torque that occurs when the steering torque Th changes across zero is reduced. This eliminates a sense of discomfort experienced by the driver.

<Other Embodiments>

The above described embodiments may be modified as follows.

In the above illustrated embodiments, the additional value α is calculated from the steering torque Th by using the map shown in FIG. 6. However, the method for calculating the additional value α may be changed as necessary. For example, when the absolute value of the steering torque Th is less than the first threshold value Th1, the additional value α may be set to a predetermined fixed value that is less than zero, and when the absolute value of the steering torque Th is greater than or equal to the first threshold value Th1, the additional value α may be set to a predetermined fixed value that is greater than zero.

In the above illustrated embodiments, it is determined whether the vehicle is in the straight-line traveling state based on the vehicle speed V and the yaw rate γ. However, the determining method is not limited to this. The determination may be made according to other known method, for example, based on the lateral acceleration of the vehicle or the difference in speed between the left and right wheels.

The present invention is not limited to electric power steering apparatuses with a dead zone, but may be applied to electric power steering apparatuses having no dead zone.

The present invention does not necessarily need to be applied to the electric power steering apparatus that applies assist torque of the motor 20 to the steering shaft 11, but may also be applied to any appropriate electric power steering apparatus, for example, an electric power steering apparatus that applies assist torque to the rack shaft 13.

The invention claimed is:

1. An electric power steering apparatus comprising:
   a motor for applying assist torque to a steering mechanism of a vehicle; and
   a controller, which controls driving of the motor to cause the assist torque to follow an assist command value, wherein
   the controller calculates a basic assist command value based on steering torque applied to the steering mechanism and corrects the basic assist command value using a correction value, thereby setting the assist command value,
   when steering torque detected when the vehicle is determined to be in a straight-line traveling state has an absolute value greater than a threshold value, the threshold value being set for determining whether a steering wheel is being steered, the controller sets the correction value such that the absolute value of the steering torque is reduced, and
   when the steering torque detected when the vehicle is determined to be in a straight-line traveling state has an absolute value less than the threshold value, the controller sets the correction value such that the absolute value of the assist command value is reduced; and
   wherein
   the controller sets the correction value using an additional value that is calculated based on the steering torque,
   when the steering torque detected when the vehicle is determined to be in a straight-line traveling state has an absolute value greater than the threshold value, the controller sets the additional value to a positive value such that the absolute value of the correction value is increased, and
   when the steering torque detected when the vehicle is determined to be in a straight-line traveling state has an absolute value less than the threshold value, the controller sets the additional value to a negative value such that the absolute value of the correction value is reduced; and
   wherein
   when the steering torque detected when the vehicle is determined to be in a straight-line traveling state is greater than zero, the controller adds the additional value to the correction value of a previous cycle to calculate a new correction value, and
   when the steering torque detected when the vehicle is determined to be in a straight-line traveling state is less than zero, the controller subtracts the additional value from the correction value of the previous cycle to calculate a new correction value, wherein
   the additional value is zero when the detected steering torque is zero or equal to the threshold value;
   the additional value is a negative with an amount varying depending on the value of the detected steering torque when the detected steering torque is between zero and the threshold value; and
   the additional value is a positive value that increases with increasing amount of the detected steering torque when the detected steering torque is greater than the threshold value.

2. The electric power steering apparatus according to claim 1, wherein the controller has a dead zone in which when the steering torque has an absolute value that is less than or equal to a predetermined value that lies within the dead zone, the basic assist command value is set to zero.

3. The electric power steering apparatus according to claim 2, wherein
   when the steering torque has an absolute value greater than zero, the controller sets the correction value to zero when the direction of assist torque that corresponds to the correction value is different from the direction of the steering torque, and
   when the steering torque is zero, the controller sets the correction value to zero.

4. The electric power steering apparatus according to claim 2, wherein
   the threshold value is a first threshold value,
   when the steering torque has an absolute value greater than or equal to a second threshold value that is different from the first threshold value, the controller sets the correction value to zero when the direction of assist torque that corresponds to the correction value is different from the direction of the steering torque, and
   when the steering torque has an absolute value less than the second threshold value, the controller sets the correction value to zero.

5. The electric power steering apparatus according to claim 2, wherein
   the threshold value is a first threshold value,
   when the steering torque has an absolute value greater than or equal to a second threshold value that is different from the first threshold value, the controller sets the correction value to zero when the direction of assist torque that corresponds to the correction value is different from the direction of the steering torque, and when the steering torque has an absolute value less than the second threshold value, the controller limits the correction value within a predetermined range.

6. The electric power steering apparatus according to claim 1, wherein when the steering torque has an absolute value greater than zero, the controller sets the correction value to zero when the direction of assist torque that corresponds to the correction value is different from the direction of the steering torque, and when the steering torque is zero, the controller sets the correction value to zero.

7. The electric power steering apparatus according to claim 1, wherein the threshold value is a first threshold value, when the steering torque has an absolute value greater than or equal to a second threshold value that is different from the first threshold value, the controller sets the correction value to zero when the direction of assist torque that corresponds to the correction value is different from the direction of the steering torque, and when the steering torque has an absolute value less than the second threshold value, the controller sets the correction value to zero.

8. The electric power steering apparatus according to claim 1, wherein the threshold value is a first threshold value, when the steering torque has an absolute value greater than or equal to a second threshold value that is different from the first threshold value, the controller sets the correction value to zero when the direction of assist torque that corresponds to the correction value is different from the direction of the steering torque, and when the steering torque has an absolute value less than the second threshold value, the controller limits the correction value within a predetermined range.

9. An electric power steering apparatus comprising:

a motor for applying assist torque to a steering mechanism of a vehicle; and a controller, which controls driving of the motor to cause the assist torque to follow an assist command value, wherein the controller calculates a basic assist command value based on steering torque applied to the steering mechanism and corrects the basic assist command value using a correction value, thereby setting the assist command value, when steering torque detected when the vehicle is determined to be in a straight-line traveling state has an absolute value greater than a threshold value, the threshold value being set for determining whether a steering wheel is being steered, the controller sets the correction value such that the absolute value of the steering torque is reduced, and when the steering torque detected when the vehicle is determined to be in a straight-line traveling state has an absolute value less than the threshold value, the controller sets the correction value such that the absolute value of the assist command value is reduced; and wherein the controller sets the correction value using an additional value that is calculated based on the steering torque, when the steering torque detected when the vehicle is determined to be in a straight-line traveling state has an absolute value greater than the threshold value, the controller sets the additional value to a positive value such that the absolute value of the correction value is increased, and when the steering torque detected when the vehicle is determined to be in a straight-line traveling state has an absolute value less than the threshold value, the controller sets the additional value to a negative value such that the absolute value of the correction value is reduced;

the additional value is zero when the detected steering torque is zero or equal to the threshold value;

the additional value is a negative with an amount varying depending on the value of the detected steering torque when the detected steering torque is between zero and the threshold value; and the additional value is a positive value that increases with increasing amount of the detected steering torque when the detected steering torque is greater than the threshold value.

* * * * *